United States Patent
Brown et al.

(10) Patent No.: US 10,648,375 B2
(45) Date of Patent: May 12, 2020

(54) ECCENTRIC GEARS WITH REDUCED BEARING SPAN

(71) Applicant: BorgWarner Inc., Auburn Hills, MI (US)

(72) Inventors: Daniel Brown, Freeville, NY (US); Shawn Blackmur, Brooktondale, NY (US); Chris D. Thomas, Dryden, NY (US)

(73) Assignee: BORGWARNER, INC., Auburn Hills, MI (US)

( * ) Notice: Subject to any disclaimer, the term of this patent is extended or adjusted under 35 U.S.C. 154(b) by 0 days.

(21) Appl. No.: 16/155,125

(22) Filed: Oct. 9, 2018

(65) Prior Publication Data

US 2019/0107015 A1    Apr. 11, 2019

Related U.S. Application Data

(60) Provisional application No. 62/570,254, filed on Oct. 10, 2017.

(51) Int. Cl.
*F01L 1/352* (2006.01)
*F01L 1/02* (2006.01)
*F16H 1/32* (2006.01)

(52) U.S. Cl.
CPC .............. *F01L 1/352* (2013.01); *F01L 1/022* (2013.01); *F16H 1/32* (2013.01); *F01L 2103/00* (2013.01); *F01L 2250/02* (2013.01); *F01L 2250/04* (2013.01); *F01L 2820/032* (2013.01)

(58) Field of Classification Search
CPC ... F01L 1/344; F01L 1/352; F01L 1/46; F01L 2013/103; F01L 2820/032

USPC .......................................... 123/90.15, 90.17
See application file for complete search history.

(56) References Cited

U.S. PATENT DOCUMENTS

| | | | |
|---|---|---|---|
| 6,981,478 B2 | 1/2006 | Schafer et al. | |
| 7,377,242 B2 | 5/2008 | Uehama et al. | |
| 7,578,271 B2 * | 8/2009 | Sugiura | F01L 1/022 123/90.15 |
| 7,603,975 B2 | 10/2009 | Sugiura et al. | |
| 7,621,243 B2 | 11/2009 | Sugiura et al. | |
| 7,624,710 B2 * | 12/2009 | Uehama | F01L 1/352 123/90.15 |
| 7,959,537 B2 | 6/2011 | Sugiura et al. | |

(Continued)

FOREIGN PATENT DOCUMENTS

| | | | |
|---|---|---|---|
| DE | 4110195 A1 | 3/1991 | |
| DE | 19542024 A1 | 3/1997 | |
| WO | WO-2010018821 A1 * | 2/2010 | F01L 1/344 |

*Primary Examiner* — Jorge L Leon, Jr.
(74) *Attorney, Agent, or Firm* — Reising Ethington P.C.

(57) ABSTRACT

An electrically-controlled eccentric camshaft phaser (10) that adjusts phase between a camshaft and a crankshaft includes a sprocket (12), configured to connect to the crankshaft and rotate about a center axis (x), having a sprocket ring gear (14); a camshaft plate (20) configured to connect to the camshaft and rotate about the center axis (x), having a camshaft ring gear (22); an eccentric shaft (28) that includes a crankshaft eccentric section (52) and a camshaft eccentric section (54); a sprocket bearing (16) that is received by the crankshaft eccentric section (52); a camshaft bearing (64), having a different diameter than the sprocket bearing (16), that is received by the camshaft eccentric section (54).

22 Claims, 5 Drawing Sheets

(56) References Cited

U.S. PATENT DOCUMENTS

| | | | |
|---|---|---|---|
| 8,424,500 B2 | 4/2013 | David et al. | |
| 8,682,564 B2 | 3/2014 | Gauthier et al. | |
| 8,800,513 B2 | 8/2014 | David et al. | |
| 9,394,810 B2 | 7/2016 | Otsubo et al. | |
| 9,422,836 B2 * | 8/2016 | Takahashi | F01L 1/34 |
| 2007/0101961 A1 * | 5/2007 | Teraya | F02D 41/06 |
| | | | 123/90.17 |
| 2008/0210182 A1 * | 9/2008 | Schaefer | F01L 1/34 |
| | | | 123/90.17 |
| 2009/0199797 A1 * | 8/2009 | Schafer | F01L 1/34 |
| | | | 123/90.17 |
| 2015/0322826 A1 * | 11/2015 | Yamanaka | F01L 1/352 |
| | | | 123/90.18 |
| 2016/0290181 A1 | 10/2016 | Otsubo et al. | |
| 2016/0348543 A1 | 12/2016 | Yamanaka et al. | |

\* cited by examiner

ECCENTRIC GEARS WITH REDUCED BEARING SPAN

CROSS-REFERENCE TO RELATED APPLICATIONS

This application claims the benefit of U.S. Patent Application No. 62/570,254 filed on Oct. 10, 2017, the disclosure of which is herein incorporated by reference in its entirety.

TECHNICAL FIELD

The present application relates to camshaft phasers and, more particularly, to electrically-actuated camshaft phasers that use eccentric gears.

BACKGROUND

Internal combustion engines include camshafts that open and close valves regulating the combustion of fuel and air within combustion chambers of the engines. The opening and closing of the valves are carefully timed relative to a variety of events, such as the injection and combustion of fuel into the combustion chamber and the location of the piston relative to top-dead center (TDC). Camshaft(s) are driven by the rotation of the crankshaft via a drive member connecting these elements, such as a belt or chain. In the past, a fixed relationship existed between the rotation of the crankshaft and the rotation of the camshaft. Increasingly, internal combustion engines now use camshaft phasers that vary the phase of camshaft rotation relative to crankshaft rotation.

A variety of different camshaft phaser designs exist. Some camshaft phasers rely on hydraulic fluid to adjust the angular position of the camshaft relative to the crankshaft while others are actuated by electric motors that advance or retard the opening/closing of valves relative to crankshaft rotation. Camshaft phasers that are actuated by electric motors can use a plurality of gears to vary the angular position of a camshaft relative to a crankshaft. Vehicle designers work to create vehicle engines that consume less space while producing the same, if not more, horsepower. Designing vehicle engines having smaller physical dimensions can be furthered by reducing the size of engine components, such as camshaft phasers.

SUMMARY

In one embodiment, an electrically-controlled eccentric camshaft phaser that adjusts phase between a camshaft and a crankshaft and includes a sprocket, configured to connect to the crankshaft and rotate about a center axis, having a sprocket ring gear that includes a plurality of radially-inwardly facing gear teeth; a camshaft plate, configured to connect to the camshaft and rotate about the center axis, having a camshaft ring gear that includes a plurality of radially-inwardly facing gear teeth; an eccentric shaft that includes a crankshaft eccentric section and a camshaft eccentric section; a sprocket bearing that is received by the sprocket and the crankshaft eccentric section; a camshaft bearing, having a different diameter than the sprocket bearing, that is received by the camshaft eccentric section, wherein at least a portion of the sprocket bearing and the camshaft bearing abut each other; and a compound planetary gear including a sprocket planetary gear engaging the sprocket ring gear and a camshaft planetary gear engaging the camshaft ring gear.

In another embodiment, an electrically-controlled eccentric camshaft phaser that adjusts phase between a camshaft and a crankshaft includes a sprocket, configured to connect to the crankshaft and rotate about a center axis, having a sprocket ring gear that includes a plurality of radially-inwardly facing gear teeth; a sprocket bearing that is received via an axial side of the sprocket and abuts the sprocket ring gear; a camshaft bearing, having a different diameter than the sprocket bearing, that is received via the axial side; a camshaft plate, including a camshaft ring gear axially spaced from the sprocket ring gear, configured to rotationally couple with the camshaft and rotate about the center axis, includes a plurality of radially-inwardly facing gear teeth; an eccentric shaft including a crankshaft eccentric section that is engaged with an inner diameter of the sprocket bearing and a camshaft eccentric section that is engaged with an inner diameter of the camshaft bearing, wherein the eccentric shaft is adapted for insertion into the camshaft phaser via the axial side of the sprocket passing through the inner diameter of the sprocket bearing and the inner diameter of the camshaft bearing; and a compound planetary gear including a sprocket planetary gear engaging the sprocket ring gear and a camshaft planetary gear engaging the camshaft ring gear.

In yet another embodiment, an electrically-controlled eccentric camshaft phaser that adjusts phase between a camshaft and a crankshaft includes a sprocket, configured to connect to the crankshaft and rotate about a center axis (x), having a sprocket ring gear that includes a plurality of radially-inwardly facing gear teeth; a camshaft plate, configured to connect to the camshaft and rotate about the center axis (x), having a camshaft ring gear that includes a plurality of radially-inwardly facing gear teeth; a sprocket bearing that is received by the sprocket; a camshaft bearing, having a different diameter than the sprocket bearing, received by the camshaft plate; a compound planetary gear including a sprocket planetary gear engaging the sprocket ring gear and a camshaft planetary gear engaging the camshaft ring gear; and an eccentric shaft that includes a crankshaft eccentric portion engaging the sprocket bearing, a camshaft eccentric portion engaging the camshaft bearing, and a bearing spacer, wherein the bearing spacer does not extend radially-outwardly beyond the camshaft eccentric portion.

DETAILED DESCRIPTION

Figure 1:
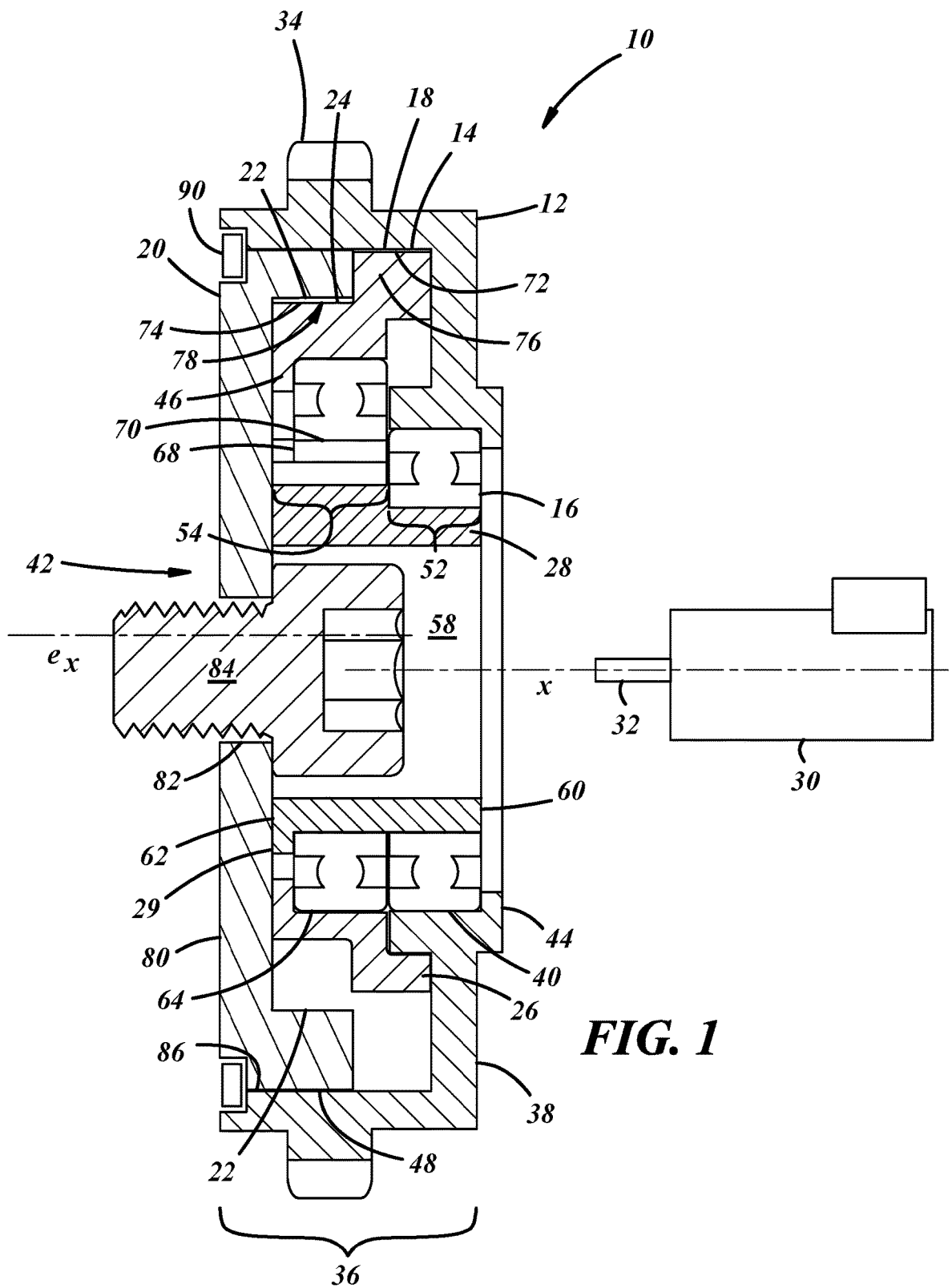
FIG. 1 is a cross-sectional view depicting an implementation of an electrically-controlled eccentric camshaft phaser.

An electrically-controlled camshaft phaser includes an eccentric shaft, a compound planetary gear, and a plurality of ring gears that vary the angular position of the camshaft relative to the crankshaft. A sprocket housing or crankshaft sprocket includes a sprocket ring gear having a plurality of inwardly-facing gear teeth and sprocket teeth that connect to the crankshaft via an endless loop, such as a timing chain. A bearing opening in an end of the sprocket receives a sprocket bearing. A camshaft bearing, having a different diameter than the sprocket bearing, can be positioned axially adjacent to the sprocket bearing such that in some implementations a portion of the camshaft bearing abuts or touches the sprocket bearing and in other implementations they are slightly separated by a bearing spacer. An eccentric shaft fits within the inner diameter of both the sprocket bearing and the camshaft bearing when inserted from one side of the camshaft phaser and can include one or more features that constrain the bearings from axial movement. A compound planet gear having an inner diameter and an outer diameter can attach to an outer diameter surface of the camshaft bearing. A camshaft plate connects to a camshaft and includes a camshaft ring gear having a plurality of inwardly-facing gear teeth. The compound planet gear engages the sprocket ring gear and the camshaft ring gear. An electric motor is coupled to the eccentric shaft, which rotates the compound planet gear to vary the angular position of the camshaft relative to the crankshaft.

The electrically-controlled camshaft phaser uses bearings having different diameters that are axially close together or abutting so that, during assembly, the phaser bearings and the eccentric shaft are inserted into the camshaft phaser from one side. The close or abutting relationship between the phaser bearings can minimize moment loading on the phaser bearings from the eccentric shaft. When the gears of the eccentric camshaft phaser are loaded, the camshaft bearing and the sprocket bearing prevent excessive tipping of the eccentric shaft. The phaser bearings, implemented as single row bearings, can transmit the load radially as needed. By single row bearings, this means that the bearings use a single row of ball bearings. Further, the eccentric shaft can allow a larger inner diameter that provides additional clearance for a bolt that attaches the camshaft phaser to the camshaft or use of a larger bolt. In contrast, past camshaft phasers use eccentric shafts that receive one phaser bearing on one end of the eccentric shaft and another phaser bearing on an opposite end. These bearings are installed on opposite sides of the eccentric shaft because of a shoulder having a larger diameter than the eccentric shaft located in between the phaser bearings. Assembling such a camshaft phaser involves accessing both sides of the camshaft phaser or at least both sides of the eccentric shaft, which makes assembly more challenging. Also, separating the bearings with the eccentric shaft shoulder can increase the overall axial length of the camshaft phaser as well as the moment loading relative to the camshaft phaser.

Figure 2:
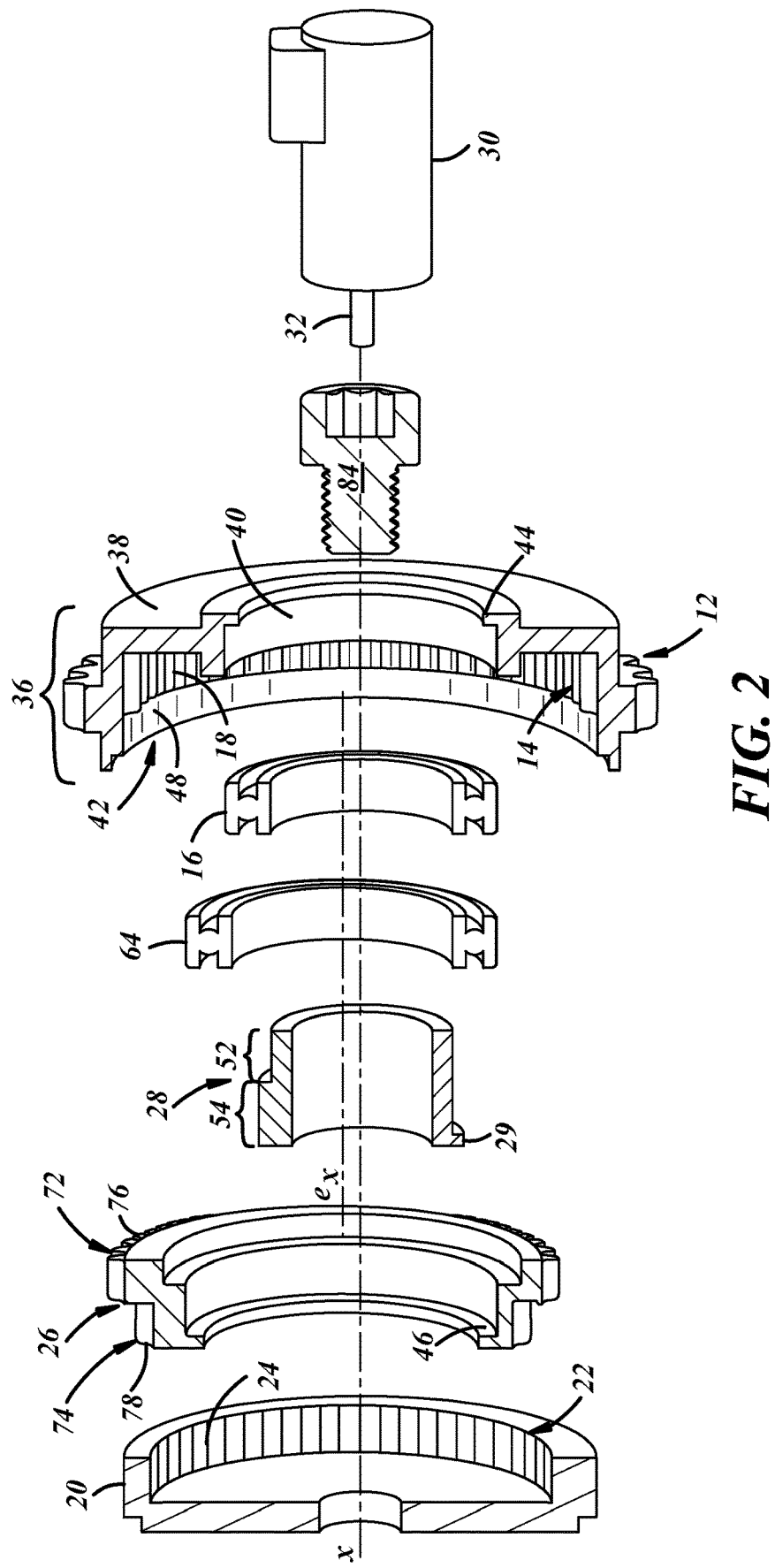
FIG. 2 is an exploded view depicting an implementation of an electrically-controlled eccentric camshaft phaser.

An embodiment of an electrically-controlled camshaft phaser that is controlled using an electric motor and an eccentric shaft is shown in FIGS. 1-2. The camshaft phaser 10 includes a crankshaft sprocket 12 that connects to a crankshaft and includes a sprocket ring gear 14 and a sprocket bearing 16. The sprocket ring gear 14 includes a set of inwardly-facing gear teeth 18. A camshaft plate 20 attaches to a camshaft and includes a camshaft ring gear 22 comprising a separate set of inwardly-facing gear teeth 24. A compound planetary gear 26 uses two sets of outwardly facing gear teeth that each engage with the camshaft ring gear 22 and the sprocket ring gear 14. An eccentric shaft 28 connects to the crankshaft sprocket 12 or the camshaft plate 20 such that a portion of the eccentric shaft 28 rotates about the axis (x). The eccentric shaft 28 also connects to the compound planetary gear 26 along an eccentric axis ($e_x$). The crankshaft sprocket 12 and the camshaft plate 20 each rotate about axis (x). A portion of the eccentric shaft 28 is rotationally driven by an electric motor 30 about axis x according to desired phasing such that the compound planetary gear 26 rotates about the eccentric axis $e_x$.

Operating the electric motor 30 so that an output shaft 32 rotates the eccentric shaft 28 at the same speed as the crankshaft sprocket 12 maintains an existing angular position of the camshaft relative to the crankshaft. Changing the rate at which the output shaft 32 rotates relative to the rate at which the crankshaft sprocket 12 rotates changes the angular position (also called "phase") of the camshaft relative to the crankshaft. For example, when the output shaft 32 rotates faster than the crankshaft sprocket 12, the eccentric shaft 28 rotates the compound planetary gear 26 relative to the sprocket ring gear 14 and the camshaft ring gear 22 thereby displacing the camshaft plate 20 relative to the crankshaft sprocket 12 to advance the phase of the camshaft relative to the crankshaft. And when the output shaft 32 rotates slower than the crankshaft, the eccentric shaft 28 rotates the compound planetary gear 26 relative to the sprocket ring gear 14 and the camshaft ring gear 22 thereby displacing the camshaft plate 20 relative to the camshaft sprocket 12 to retard the phase of the camshaft relative to the crankshaft.

The crankshaft sprocket 12 receives rotational drive input from the engine's crankshaft and rotates about the axis x. An endless loop power transmission member, such as a timing chain or a timing belt, can be looped around the sprocket 12 and around the crankshaft so that rotation of the crankshaft translates into rotation of the sprocket 12 via the member. Other techniques for transferring rotation between the sprocket 12 and crankshaft are possible. Along an outer surface, the sprocket 12 has a plurality of sprocket teeth 34 for mating with the timing chain, with the timing belt, or with another component. As shown, the sprocket 12 has a housing 36 spanning axially from the sprocket teeth 34. The housing 36 includes the sprocket ring gear 14 within the housing 36 spaced axially and radially inward from the teeth 34. The sprocket ring gear 14 includes a plurality of inwardly-facing gear teeth 18 and an end plate 38 at least partially closing one end of the sprocket 12. The end plate 38 includes a bearing opening 40 that is roughly the same diameter as the sprocket bearing 16. The sprocket bearing 16 is received by the sprocket 12 in the bearing opening 40 and abuts a bearing shoulder 44. The gear teeth 18 of the sprocket ring gear 14 can be offset axially from the sprocket teeth 34 and the sprocket bearing 16. In one implementation, all of the components of the camshaft phaser 10 are located in the axial space of the housing 36.

The eccentric shaft 28 includes a crankshaft portion 52 and a camshaft portion 54 one of which is eccentric to the other. The crankshaft portion 52 and the camshaft portion 54 are not separated by a shoulder having an outer diameter larger than either the crankshaft portion 52 or the camshaft portion 54 that would separate the phaser bearings. Instead, the crankshaft portion 52 and the camshaft portion 54 are each sized to permit the phaser bearings to both slide over the eccentric shaft 28 from one end and, in some implementations, abut each other when the camshaft phaser 10 is assembled. Put differently, the sprocket bearing 16 and the camshaft bearing 64 can both be inserted into the sprocket 12 and the eccentric shaft 28 can then be inserted into the inner diameters of both bearings at the same time from one side of the eccentric phaser 10.

The crankshaft portion 52 can be substantially annular having an outside surface that closely conforms to an inner diameter of the sprocket bearing 16. The camshaft portion 54 can be eccentric relative to the crankshaft portion 52. An outer surface of the camshaft portion 54 may be smaller in diameter relative to a camshaft bearing 64 and includes a recess 69 (shown in FIG. 5) for receiving a planetary biasing member 68. The camshaft bearing 64 can have a larger inner and outer diameter than the sprocket bearing 16. The increased diameter size of the camshaft bearing 64 can permit insertion of the eccentric shaft 28 even after the sprocket bearing 16 has been inserted into the bearing opening 40 and the sprocket bearing 16 has been placed into the sprocket 12. The planetary biasing member 68 can help forcibly engage the compound planetary gear 26 with the sprocket ring gear 14 and the camshaft ring gear 22. One end of the planetary biasing member 68 can engage the eccentric shaft 28 at the recess 69 and another end of the member 68 can direct force radially outwardly and toward an internal surface 70 of the camshaft bearing 64. The recess 69 is located on the outer surface of the camshaft portion 54 and includes a reduced diameter section that can prevent movement of the planetary biasing member 68.

The compound planetary gear 26 includes a sprocket planetary gear 72 and a camshaft planetary gear 74. The sprocket planetary gear 72 and the camshaft planetary gear 74 include a set of outwardly-facing sprocket planetary gear teeth 76 that engage with the sprocket ring gear 14 and a set of outwardly-facing camshaft planetary gear teeth 78 that engage with the camshaft ring gear 22, respectively. The number of gear teeth 76 used by the sprocket planetary gear 72 is different than the number of gear teeth 18 used by the sprocket ring gear 14 by more than one. And the camshaft ring gear 22 includes one or more additional gear teeth 24 relative to number of gear teeth 78 on the camshaft planetary gear 74. In one implementation, the number of gear teeth differ by two.

The camshaft plate 20 is configured to be attached to the camshaft and includes the camshaft ring gear 22. A camshaft plate end 80 substantially closes one end of the camshaft plate 20 and includes a bolt aperture 82 through which a retention bolt 84 passes and couples the camshaft to the camshaft plate 20. While in this embodiment a single retention bolt 84 is shown, other implementations could use a plurality of retention bolts. In addition, the camshaft plate 20 includes an outer surface 86 that abuts the inwardly-facing surface 48 of the sprocket 12 so that the outer surface 86 of the camshaft plate 20 is radially-inward from the inwardly-facing surface 48 of the sprocket 12.

Figure 3:
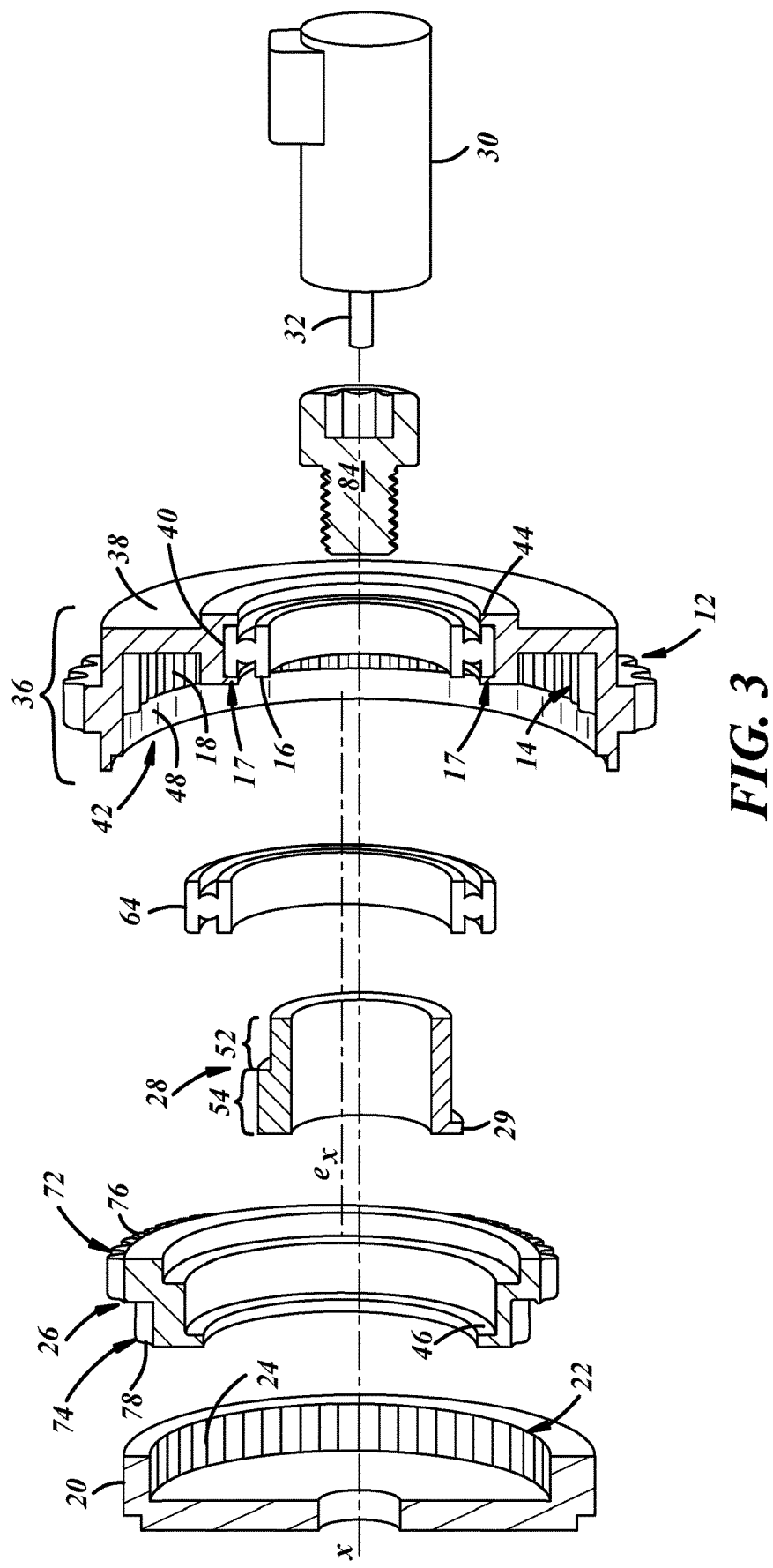
FIG. 3 is an exploded view depicting an implementation of an electrically-controlled eccentric camshaft phaser.

Another implementation of the camshaft phaser 10 is shown in FIG. 3. In this implementation, the sprocket 12 includes a feature 17 that is formed after the sprocket bearing 16 has been inserted into the bearing opening 40. The feature 17 then prevents the axial movement of the sprocket bearing 16. The feature 17 can be created from the sprocket 12 shown in FIGS. 1-2 after the sprocket bearing 16 has been inserted into the bearing opening 40. A portion of the bearing opening 40 can be roller formed in a radially-inwardly direction to create a diameter-reduced portion that secures the sprocket bearing 16 against the bearing shoulder 44. After the camshaft bearing 64 is installed in the camshaft phaser 10, it can be axially separated from the sprocket bearing 16 to allow space for feature 17. The sprocket bearing 16 may be separated from the camshaft bearing 64 by as much as 1.0 mm.

Figure 4A:
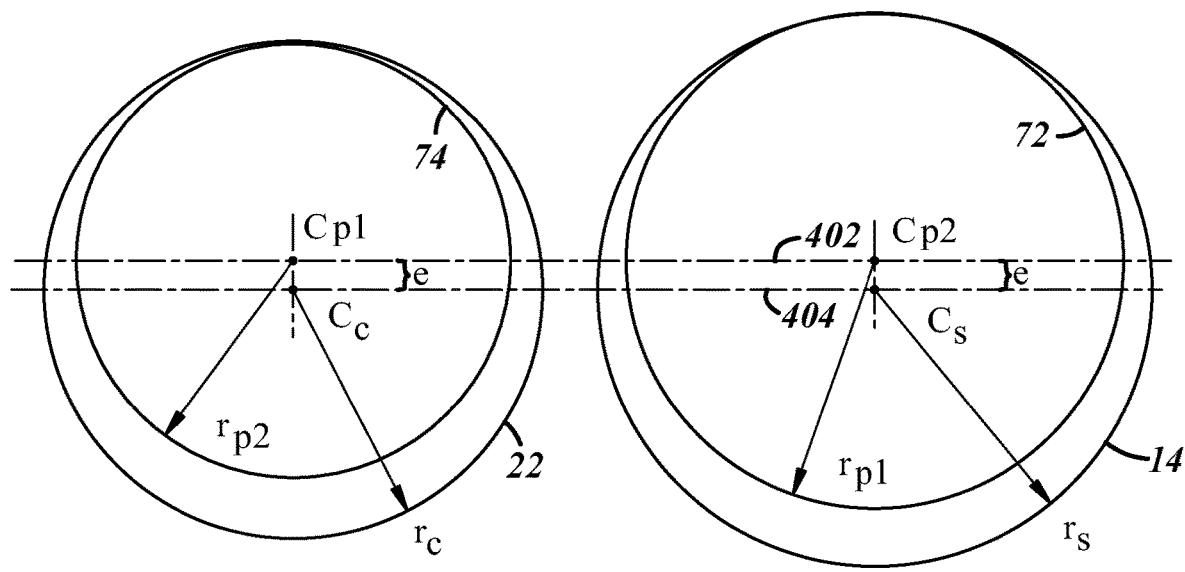
FIG. 4*a* is a view of the eccentricity relationship between a cam ring gear and a sprocket ring gear.
Figure 4B:
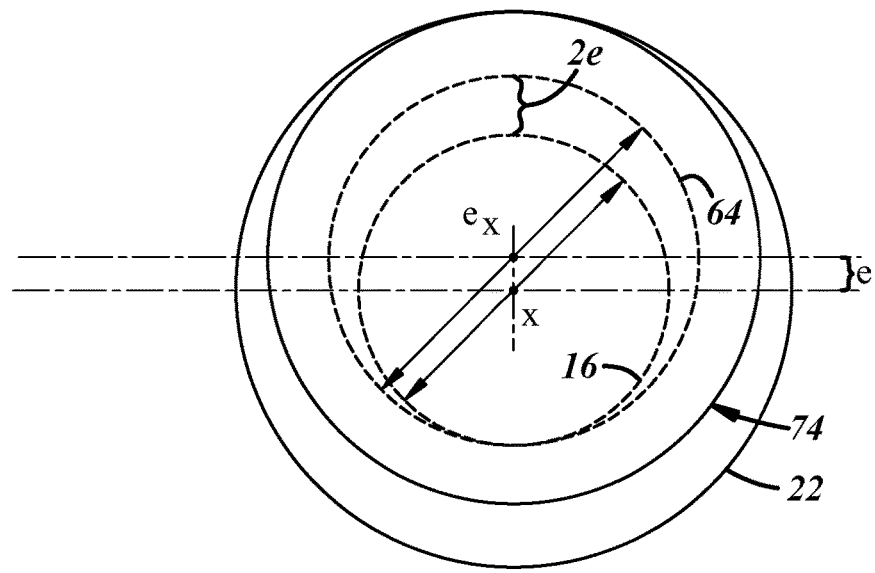
FIG. 4*b* is another view of the eccentricity relationship between a cam ring gear and a sprocket ring gear with respect to a sprocket bearing and a camshaft bearing.

Turning to FIGS. 4a-4b, the sprocket bearing 16 and the camshaft bearing 64 have different diameters, one larger than the other, as discussed above. And in one implementation, the camshaft bearing 64 is larger in diameter than the sprocket bearing 16 by at least two times the eccentricity of the eccentric shaft 28. As shown in FIG. 4a, this relates to the relationship between the camshaft ring gear 22 having radius $r_c$ and the sprocket ring gear 14 having radius $r_s$ as well as the sprocket planetary gear 72 having radius $r_{p1}$ and the camshaft planetary gear 74 having radius $r_{p2}$. The diameters of the camshaft ring gear 22 and the sprocket ring gear 14 as well as the camshaft planetary gear 74 and the sprocket planetary gear 72 are shown. A first line 402 is drawn through the center ($C_{p1}$) of the camshaft planetary gear 74 and the center ($C_{p2}$) of the crankshaft planetary gear 72. A second line 404 is drawn through the center ($C_c$) of the camshaft ring gear 22 and the center ($C_s$) of the crankshaft ring gear 14. The eccentricity (e) of the sprocket ring gear 14 relative to the crankshaft ring gear 22 is indicated by the distance between the first line 402 and the second line 404. Given that first line 402 and the second line 404 are parallel, e represents the difference between $r_{p2}$ and $r_c$ as well as the difference between $r_{p1}$ and $r_s$. These differences of radial dimensions result in 2e, a diameter constraint. The diameter of the camshaft bearing 64 is sized relative to the diameter of the sprocket bearing 16 by a value of 2e or greater. This relationship can be appreciated from FIG. 4b in which the sprocket bearing 16 rotates about a central axis (x) while the camshaft bearing 64 rotates about an eccentric axis ($e_x$).

A compact design can be realized when a positive gear ratio exists between the sprocket gear 14 having radius $r_s$ and the camshaft gear 22 having radius $r_c$. A positive gear ratio occurs when $r_s$ is larger than $r_c$. Such a relationship facilitates fitting the camshaft plate 20 radially inward from the sprocket 12 thereby reducing the overall axial length of the camshaft phaser 10. The gear ratios (gr) and eccentricity (e) can be determined for the case of identical gear module among all the gears by using the following formulas, wherein Ns represents the number of gear teeth on the sprocket ring gear 14, $N_C$ represent the number of gear teeth on the camshaft ring gear 22, $N_{p1}$ represents the number of gear teeth on the sprocket planetary gear 72, and $N_{p2}$ represents the number of gear teeth on the camshaft planetary gear 74:

$$gr = \frac{1}{1 - \frac{N_s \cdot N_{p2}}{N_c \cdot N_{p1}}}$$

$$gr = \frac{1}{1 - \frac{r_s r_{p2}}{r_c r_{p1}}}$$

$$gr = \frac{1}{1 - \frac{r_s(r_c - e)}{r_c(r_s - e)}}$$

The sprocket bearing 16 and the camshaft bearing 64 are rolling element bearings and can be implemented in a variety of ways. For example, the bearings could be single-row ball bearings or needle bearings. Or the bearings could be crossed-roller bearings or four-point contact bearings to provide increased moment carrying capacity over the single-row bearings. And it is possible for the sprocket bearing 16, the camshaft bearing 64, or both to have an inner race and outer race of different widths. For example, the inner races of the sprocket bearing 16 and the camshaft bearing 64 can be slightly larger than the outer races of the bearings. The varied widths of the inner race and the outer race can help ensure that the races and/or cages do not interfere with one another. This will be discussed below in more detail.

When the camshaft phaser 10 is assembled, the sprocket 12 can be articulated so that the end plate 38 is facing downward before assembly begins and remains in this position until after assembly is complete. In the downward position, the sprocket bearing 16 can be inserted, from a side 42 of the sprocket 12 that is open during assembly, into the bearing opening 40 until it abuts the bearing shoulder 44 and is prevented from further downward axial movement. The camshaft bearing 64 can then be placed on top of and axially adjacent to the sprocket bearing 16. The eccentric shaft 28 can then be inserted into the inner diameter of the sprocket bearing 16 an axial distance that can be defined by a side of the camshaft portion 54 that is eccentric to the crankshaft portion 52 and abuts the sprocket bearing 16. A shoulder 29 included on one end of the eccentric shaft 28 can axially constrain the sprocket bearing 16 and the camshaft bearing 64 after insertion along an inner diameter of the camshaft bearing 64. The compound planetary gear 26 can then be fit over the outside diameter of the camshaft bearing 64. In this implementation, the compound planetary gear 26 includes an inner diameter having a shoulder 46 that axially constrains the camshaft bearing 64 along the outer diameter of the bearing 64. The planetary biasing member 68 can be compressed and inserted between the camshaft bearing 64 and the camshaft portion 54 of the eccentric shaft 28. The camshaft plate 20 is fit in close proximity to the compound planetary gear 26 so that the gear teeth 24 of the camshaft ring gear 22 contact the camshaft planetary gear 74 and are located radially outwardly from gear 74. The sprocket bearing 16, the eccentric shaft 28, the camshaft bearing 64, the compound planetary gear 26, and the camshaft plate 20 can be located within the sprocket housing 36. A cam ring 90 can be forcibly fit into a radial groove in the sprocket 12 to axially constrain the elements of the camshaft phaser 10 within the sprocket housing 36.

Figure 5:
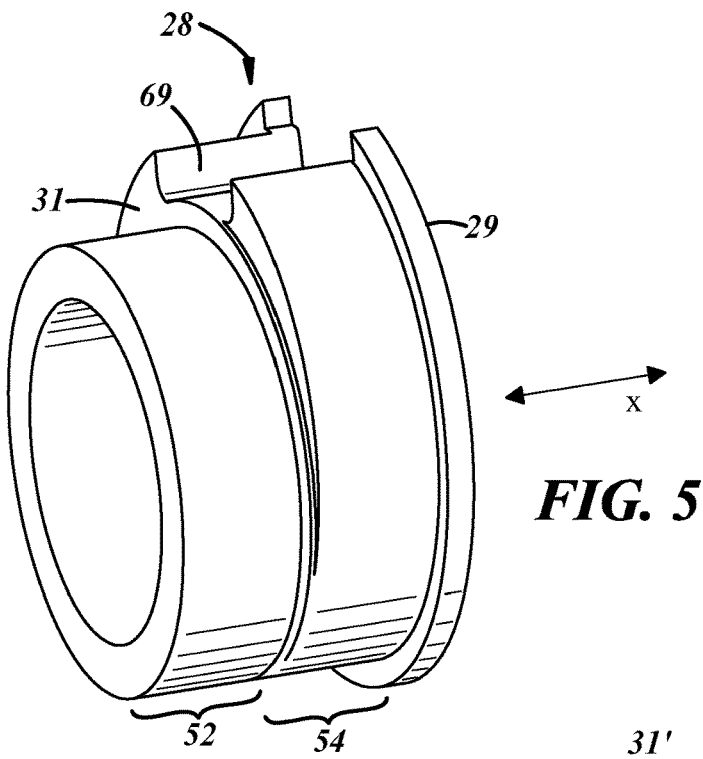
FIG. 5 is a perspective view depicting another implementation of an eccentric shaft used with an electrically-controlled eccentric camshaft phaser.

Turning to FIG. 5, another implementation of the eccentric shaft 28 is shown that includes an integral bearing spacer 31 that prevents the sprocket bearing 16 from abutting the camshaft bearing 64. In this implementation, the bearing spacer 31 extends in an axial direction (x) away from the camshaft eccentric portion 54. In some implementations, the bearing spacer 31 can extend from the camshaft eccentric portion 54 as much as 1.0 mm. The integral bearing spacer 31 can be a solid uninterrupted element that extends the entire side of the eccentric portion 54 or it could be segmented such that one or more protuberances extend from the side of the eccentric portion 54. And it should be appreciated that the bearing spacer 31 does not extend radially outwardly from the eccentric shaft 28 beyond the surface of the camshaft eccentric portion 54. The bearing spacer 31 maintains space between the sprocket bearing 16 and the camshaft bearing 64 thereby minimizing the possibility of interference between the bearing races. While the bearing spacer 31 shown in FIG. 5 as an integral part of the eccentric shaft 28, it should be understood that other implementations of bearing spacers are possible. For example, it is possible to create space between the sprocket bearing 16 and the camshaft bearing 64 using a separate element, such as a washer, that is inserted between the sprocket bearing 16 and the camshaft bearing 64.

Figure 6:
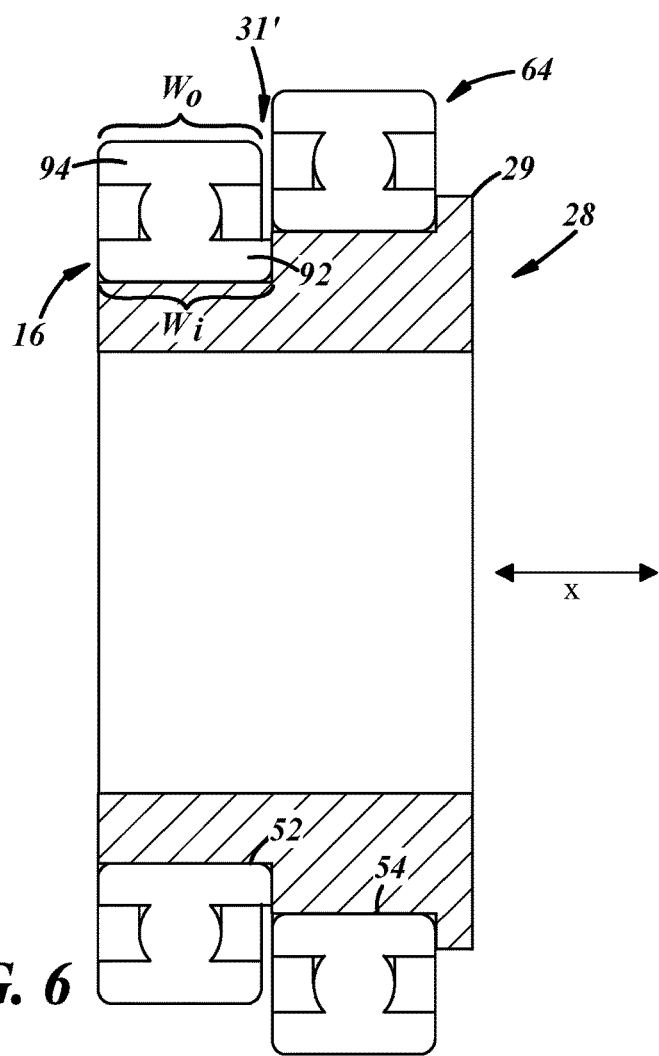
FIG. 6 is a cross-sectional view of an implementation of a sprocket bearing and a camshaft bearing along with an eccentric shaft.

The bearing spacer between the sprocket bearing 16 and the camshaft bearing 64 can be implemented in other ways as well. Turning to FIG. 6, another implementation of a bearing spacer 31' is shown. There, an inner race 92 of the camshaft bearing 16 can be wider than the outer race 94 of the camshaft bearing 16. The difference in width between the inner race and the outer race of the camshaft bearing can create a gap between the sprocket bearing 16 and the camshaft bearing 64. In this implementation, the inner race 92 has a width (Wi) and the outer race 94 has an outer race 94 ($W_O$) such that W1 is greater than W0. The inner race 92 can abut or contact a side of the eccentric shaft 28 thereby creating an axial space along axis x equal to $W_O$. The embodiment shown includes a sprocket bearing 16 received by the sprocket 12 and a camshaft bearing 64 received by a compound planetary gear 26. However, it should be appreciated that other implementations could also be realized with a sprocket bearing 16 received by a compound planetary gear 26 and a camshaft bearing 64 received by a camshaft plate 20.

It is to be understood that the foregoing is a description of one or more embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiments) will become apparent to those skilled in the art. All such other embodiments, changes, and modifications are intended to come within the scope of the appended claims.

As used in this specification and claims, the terms "e.g.," "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

What is claimed is:

1. An electrically-controlled eccentric camshaft phaser (10) that adjusts phase between a camshaft and a crankshaft, the electrically-controlled eccentric camshaft phaser comprising:
   a sprocket (12), configured to connect to the crankshaft and rotate about a center axis (x), having a sprocket ring gear (14) that includes a plurality of radially-inwardly facing gear teeth (18);
   a camshaft plate (20), configured to connect to the camshaft and rotate about the center axis (x), having a camshaft ring gear (22) that includes a plurality of radially-inwardly facing gear teeth (24);
   an eccentric shaft (28) that includes a crankshaft eccentric section (52) and a camshaft eccentric section (54);
   a sprocket bearing (16) that is received by the crankshaft eccentric section (52);
   a camshaft bearing (64), having a different inner diameter than the sprocket bearing (16), that is received by the camshaft eccentric section (54), wherein at least a portion of the sprocket bearing (16) and the camshaft bearing (64) abut each other; and
   a compound planetary gear (26) including a sprocket planetary gear (72) engaging the sprocket ring gear (16) and a camshaft planetary gear (74) engaging the camshaft ring gear (22).

2. The electrically-controlled eccentric camshaft phaser (10) recited in claim 1, wherein the sprocket bearing (16) is further received by the sprocket (12).

3. The electrically-controlled eccentric camshaft phaser (10) recited in claim 1, further comprising an electric motor (30) having an output shaft (32) that rotates the eccentric shaft (28) and controls phase adjustment between the camshaft and crankshaft by angularly displacing the sprocket (12) with respect to the camshaft plate (20).

4. The electrically-controlled eccentric camshaft phaser (10) recited in claim 1, wherein the camshaft bearing (64) diameter differs from the sprocket bearing (16) diameter by at least two times an eccentricity of the eccentric shaft (28).

5. The electrically-controlled eccentric camshaft phaser (10) recited in claim 1, wherein the sprocket bearing (16), the camshaft bearing (64), or both are single-row bearings.

6. The electrically-controlled eccentric camshaft phaser (10) recited in claim 1, wherein the sprocket bearing (16), the camshaft bearing (64), or both comprise crossed-roller bearings or four-point contact bearings.

7. The electrically-controlled eccentric camshaft phaser (10) recited in claim 1, wherein the sprocket bearing (16), the camshaft bearing (64), or both includes an inner race and an outer race having different widths.

8. The electrically-controlled eccentric camshaft phaser (10) recited in claim 1, wherein the camshaft plate (20) is located radially inwardly from the sprocket (12).

9. An electrically-controlled eccentric camshaft phaser (10) that adjusts phase between a camshaft and a crankshaft, the electrically-controlled eccentric camshaft phaser comprising:
   a sprocket (12), configured to connect to the crankshaft and rotate about a center axis (x), having a sprocket ring gear (14) that includes a plurality of radially-inwardly facing gear teeth (18);
   a sprocket bearing (16) that is received via an axial side (42) of the sprocket (12) and abuts the sprocket (12);
   a camshaft bearing (64), having a different inner diameter than the sprocket bearing (16), that is received via the axial side (42);
   a camshaft plate (20), including a camshaft ring gear (22) axially spaced from the sprocket ring gear (14), configured to rotationally couple with the camshaft and rotate about the center axis (x), includes a plurality of radially-inwardly facing gear teeth (24);
   an eccentric shaft (28) including a crankshaft eccentric section (52) that is engaged with an inner diameter of the sprocket bearing (16) and a camshaft eccentric section (54) that is engaged with an inner diameter of the camshaft bearing (64), wherein the eccentric shaft (28) is adapted for insertion into the camshaft phaser (10) via the axial side (42) of the sprocket (12) passing through the inner diameter of the sprocket bearing (16) and the inner diameter of the camshaft bearing (64); and
   a compound planetary gear (26) including a sprocket planetary gear (72) engaging the sprocket ring gear (14) and a camshaft planetary gear (74) engaging the camshaft ring gear (22).

10. The electrically-controlled eccentric camshaft phaser recited in claim 9, further comprising an electric motor (30) having an output shaft (32) that rotates the eccentric shaft (28) and controls phase adjustment between the camshaft and crankshaft by angularly displacing the sprocket (12) with respect to the camshaft plate (20).

11. The electrically-controlled eccentric camshaft phaser (10) recited in claim 9, wherein the camshaft bearing (64) diameter differs from the sprocket bearing (16) diameter by at least two times an eccentricity of the eccentric shaft (28).

12. The electrically-controlled eccentric camshaft phaser (10) recited in claim 9, wherein the sprocket bearing (16), the camshaft bearing (64), or both are single-row bearings.

13. The electrically-controlled eccentric camshaft phaser (10) recited in claim 9, wherein the sprocket bearing (16), the camshaft bearing (64), or both comprise crossed-roller bearings or four-point contact bearings.

14. The electrically-controlled eccentric camshaft phaser (10) recited in claim 9, wherein the sprocket bearing (16), the camshaft bearing (64), or both includes an inner race and an outer race having different widths.

15. The electrically-controlled eccentric camshaft phaser (10) recited in claim 9, wherein the camshaft plate (20) is located radially inwardly from the sprocket (12).

16. The electrically-controlled eccentric camshaft phaser (10) recited in claim 9, wherein a portion of a bearing opening (40) in the sprocket (12) is deformed in a radially-inwardly direction after the sprocket bearing (16) is engaged with the bearing opening (40) thereby preventing the sprocket bearing (16) from axial movement and axially separating the sprocket bearing (16) from the camshaft bearing (64).

17. An electrically-controlled eccentric camshaft phaser (10) that adjusts phase between a camshaft and a crankshaft, the electrically-controlled eccentric camshaft phaser comprising:
   a sprocket (12), configured to connect to the crankshaft and rotate about a center axis (x), having a sprocket ring gear (14) that includes a plurality of radially-inwardly facing gear teeth (18);
   a camshaft plate (20), configured to connect to the camshaft and rotate about the center axis (x), having a camshaft ring gear (22) that includes a plurality of radially-inwardly facing gear teeth (24);
   a sprocket bearing (16);
   a camshaft bearing (64), having a different inner diameter than the sprocket bearing (16);
   a compound planetary gear (26) including a sprocket planetary gear (72) engaging the sprocket ring gear (16) and a camshaft planetary gear (74) engaging the camshaft ring gear (22); and
   an eccentric shaft (28) that includes a crankshaft eccentric portion (52) engaging the sprocket bearing (16), a camshaft eccentric portion (54) engaging the camshaft bearing (64), and a bearing spacer (31).

18. The electrically-controlled eccentric camshaft phaser (10) recited in claim 17, wherein the bearing spacer (31) extends less than 1.0 mm in an axial direction.

19. The electrically-controlled eccentric camshaft phaser (10) recited in claim 17, wherein the camshaft bearing (64) diameter differs from the sprocket bearing (16) diameter by at least two times an eccentricity of the eccentric shaft (28).

20. The electrically-controlled eccentric camshaft phaser (10) recited in claim 17, wherein the sprocket bearing (16), the camshaft bearing (64), or both includes an inner race and an outer race having different widths.

21. The electrically-controlled eccentric camshaft phaser (10) recited in claim 17, wherein the camshaft plate (20) is located radially inwardly from the sprocket (12).

22. The electrically-controlled eccentric camshaft phaser (10) recited in claim 17, wherein the sprocket bearing (16) is received by the sprocket (12).

* * * * *